No. 895,693. PATENTED AUG. 11, 1908.
L. T. SICKA & J. P. COLLINS.
DUST ARRESTER AND SLUDGER.
APPLICATION FILED JAN. 26, 1907.
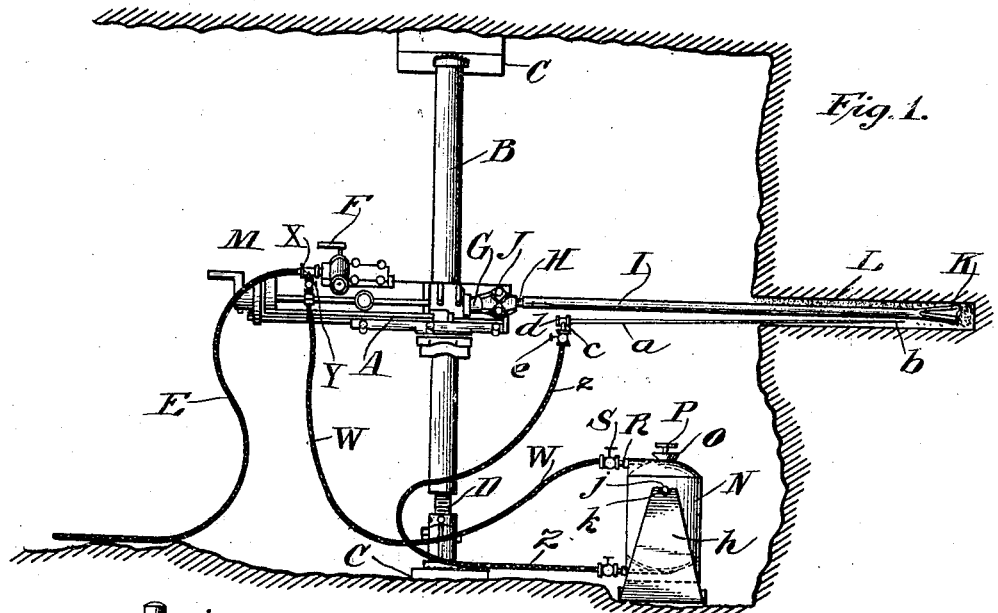
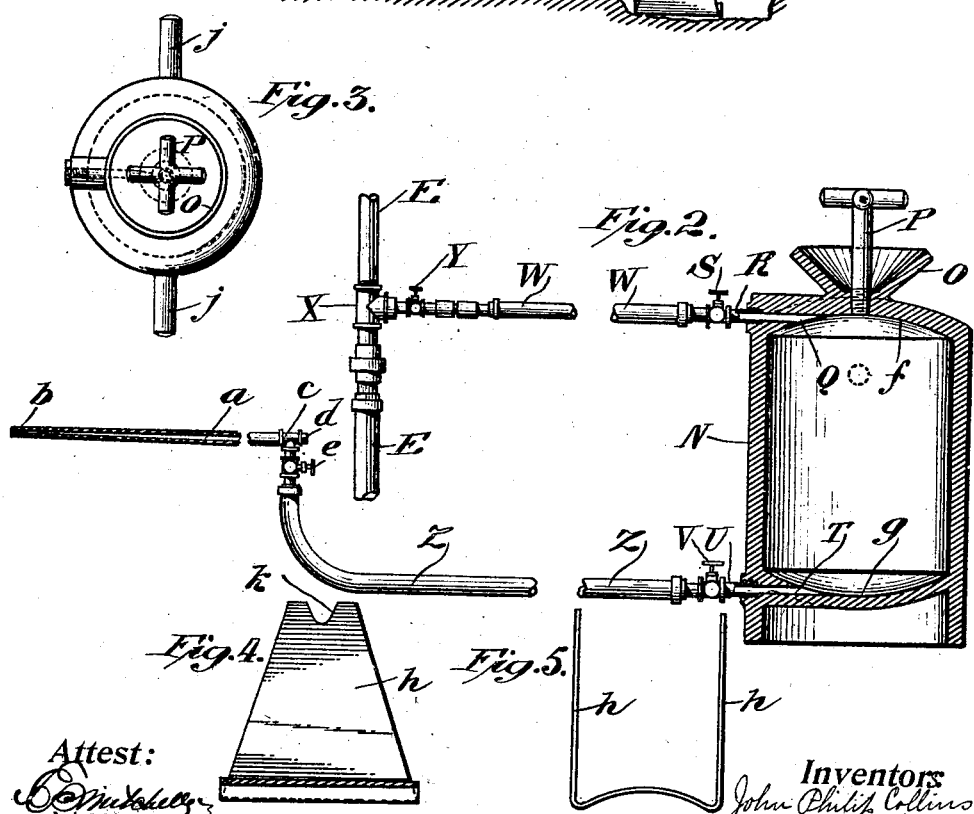

UNITED STATES PATENT OFFICE.

LOUIS THEODORE SICKA AND JOHN PHILIP COLLINS, OF BUTTE, MONTANA, ASSIGNORS OF ONE-THIRD TO WILLIAM M. KIRKPATRICK, OF BUTTE, MONTANA.

DUST ARRESTER AND SLUDGER.

No. 895,693.　　　Specification of Letters Patent.　　　Patented Aug. 11, 1908.

Application filed January 26, 1907. Serial No. 354,222.

*To all whom it may concern:*

Be it known that we, LOUIS THEODORE SICKA and JOHN PHILIP COLLINS, both citizens of the United States, and residents of the city of Butte, county of Silver Bow, and State of Montana, have invented certain new and useful Improvements in Dust-Arresters and Sludgers, of which the following is a specification.

This invention relates to drills, and it has particular reference to an apparatus for removing the cuttings or borings from the tool without removing the drill.

The object of the invention is to provide novel means for utilizing a portion of the drill operating power for forcing a stream of water into the cavity formed by the drill and in washing therefrom the borings or cuttings, which would otherwise impede the operation of the drill, the water so used also serving to prevent excessive high temperature of the drill.

Figure 1 represents a side view partly in section of a system of rock drilling machinery embodying our invention. Fig. 2 is a side view partly in section of the water tank with connections. Fig. 3 is a top view of the water tank. Fig. 4 and Fig. 5 are detail views of frame for supporting the water tank.

Referring to the drawings A. is a drilling machine which is suitably supported by the column B the ends of which are placed against the blocks C the column B being adjusted by means of the screw D.

The drilling machine A is operated by means of compressed air, steam, or gas which is supplied through the flexible hose E and is admitted to the drilling machine A by means of the valve F.

To the end of the reciprocating piston G the shank H of the drill bit I is inserted in the chuck J. The other end of the drill bit I is enlarged as at K and as the bit I is reciprocated and revolved simultaneously by the mechanism of the drilling machine A a hole L is bored by the bit I which has a uniform diameter throughout its length equal to the enlarged end K of the drill bit I. The crank M of the feed screw which operates the drilling machine A keeps the cutting end K of the drill bit I in its relative working position at the bottom of the drilled hole L.

A drilling machine as above described is often very troublesome as the bits of rock and dust cut by the end K of the drill bit I are not easily removed from the hole. The dust and bits of rock fill the hole and wedge the drill in such a manner that it does not work easily and the end of the drill instead of cutting the solid rock at the bottom of the hole continues to cut these bits of rock into smaller pieces thus interfering with the economical working of the drill. To obviate these disadvantages I have provided a water tank N preferably made of steel which is formed in this instance with a funnel shaped top O to facilitate the tank N being filled with water. The top of the tank is closed and made air tight by means of the detachable plug P. At the top of the tank N extending out through the side is a hole Q in which a suitable pipe R provided with a valve S is secured.

At the bottom of the tank N extending out through the side is a hole T in which a suitable pipe U, provided with a valve V is secured in the same manner as the pipe R is secured in the hole Q at the top of the tank N.

To the pipe R a suitable connection is made with a flexible hose W said hose being attached at the other end to the air supply hose E by means of the tee connection X below which a suitable valve Y is provided to turn off or on the air pressure supplied through the flexible pipe E. When the compressed air is turned on by opening the valves Y and S pressure is exerted on top of the water in the tank N thus forcing the water out through the bottom of the tank N through the hole T, and the pipe U out through the flexible pipe Z to the metal nozzle a.

The metal nozzle a can be made any desired length but is preferably made nearly the length of the drill bit I. The hole b at the discharge end of the nozzle a is made comparatively small to increase the velocity of the water as it leaves the nozzle. To facilitate cleaning, the nozzle a is preferably secured at right angles to the flexible hose Z by means of a tee connection c which has a removable plug d which when removed permits the easy insertion of a wire or rod for the purpose of removing any dirt that may collect inside the nozzle a. Below the tee connection c, a valve e is provided for regulating the amount of water passing through the nozzle a.

The water tank N is made with an internally rounded top f and bottom g as shown for the purpose of using all the available water in the tank when the tank is set on an uneven surface.

The tank N is preferably supported upon the frame h by means of the handles j which are rigidly attached to the tank N and rest on top of the frame h in the grooves k.

The frame Y is preferably made of steel and constructed out of one piece of sheet metal which affords a very simple and effective device for supporting the water tank M always in a vertical direction so as to permit the use of all the water contained in the water tank N when the surface upon which the frame h rests is uneven.

The operation of the device is as follows: The drilling machine A is first put in position as shown in Fig. 1 and is then operated by the compressed air which is supplied through the hose E and regulated by means of the valve F which turns the compressed air on or off as desired. The water tank N is then filled with water by removing the plug P which is again inserted after filling the tank. The hose W leading to the top of the water tank N is then made fast by proper connections to the tee X on the supply hose E. The valve Y in the hose W is then opened and the air under pressure passes from the hose E through the hose W to the surface of the water in the top of the tank N. The pressure thus exerted forces the water out through the bottom of the tank N through the hose K to the nozzle a. The nozzle a is then inserted in the hole L made by the drill as shown in Fig. 1. The water as it passes into the end of the drill hole under pressure keeps the hole and drill free and clear of all bits of rock and dust, and permits the drill to work without stopping for the purpose of cleaning the drill holes.

The apparatus works entirely independent of the drilling machine A and injects a continuous stream of water under pressure at the point it is most needed and can be operated very easily by either the operator or his helper.

The motive power is consumed merely to the extent of the amount of water displaced in the tank N.

By injecting water under pressure to the bottom of the drill hole all dust is prevented thus obviating all the disagreeable effects resulting therefrom upon the health of the operator.

The water tank may be placed in any convenient position out of the way of the operator, and is so constructed, that the uneven surface of the ground upon which it may rest, does not interfere with the tank assuming an upright position, which is necessary to utilize all of the water placed in the tank. The water tank may be placed either above or below the level of the hole to be drilled and works equally well in either position.

The water tank is constructed in the simplest possible manner and in no way interferes with the operation of the drilling machine. The water tank can be easily cleaned together with all its attachments especially the nozzle a which is secured to the pipe Z in such a manner that it can very readily be cleaned when it becomes clogged with small bits of rock or other substance.

What we claim is:

1. In a rock drilling system, an air supply, an air operated rock drilling machine, a drill bit enlarged at the cutting end and operated by said drilling machine, a water tank, the top of which is flexibly connected to the air supply, a nozzle flexibly connected to the bottom of said water tank and adapted to be inserted in the drill hole behind the enlarged end of the drill bit, means for regulating the air pressure in the water tank, means for regulating the water discharged at the cutting end of the drill bit, said water tank being provided with an internally concaved lower end for utilizing all the water in the tank.

2. In a rock drilling system, an air supply, an air operated rock drilling machine, a drill bit enlarged at the cutting end, a water tank, the top of which is flexibly connected to the air supply, a tubular nozzle flexibly connected to the bottom of said water tank and of small size so as to be inserted in the drill hole behind the enlarged end of the drill bit, means for regulating the air pressure in the water tank, means for regulating the water discharged at the cutting end of the drill bit, and means for utilizing all the water in the tank.

3. In a rock drilling system, an air supply, an air operated rock drilling machine, a drill bit enlarged at the cutting end, a water tank, the top of which is flexibly connected to the air supply, a tubular nozzle flexibly connected to the bottom of said water tank and of small size so as to be inserted in the drill hole behind the enlarged end of the drill bit, means for regulating the air pressure in the water tank, means for regulating the water discharged at the cutting end of the drill bit, handles on said water tank, and a frame for supporting said water tank in an upright position, whereby all the water in the tank may be utilized.

In testimony whereof we have signed this specification in the presence of two subscribing witnesses.

LOUIS THEODORE SICKA.
JOHN PHILIP COLLINS.

Witnesses as to the signature of Louis Theodore Sicka:
  WM. D. GORDON,
  J. N. BUCKLEY.

Witnesses as to the signature of John Philip Collins:
  HARVEY W. BALSLEY,
  MIKE LYNCH.